(12) United States Patent
Carroll et al.

(10) Patent No.: US 7,494,566 B2
(45) Date of Patent: *Feb. 24, 2009

(54) COMPOSITION FOR INCREASING CELLULOSIC PRODUCT STRENGTH AND METHOD OF INCREASING CELLULOSIC PRODUCT STRENGTH

(75) Inventors: William Eamon Carroll, Orefield, PA (US); Christian Jehn Rendu, Andrezieux Cedex (FR); Eric J. Beckman, Aspinwall, PA (US)

(73) Assignee: University of Pittsburgh - Of the Commonwealth System of Higher Education, Pittsburgh, PA (US)

( * ) Notice: Subject to any disclaimer, the term of this patent is extended or adjusted under 35 U.S.C. 154(b) by 466 days.

This patent is subject to a terminal disclaimer.

(21) Appl. No.: 10/799,793

(22) Filed: Mar. 12, 2004

(65) Prior Publication Data

US 2005/0082025 A1 Apr. 21, 2005

Related U.S. Application Data

(63) Continuation-in-part of application No. 10/252,262, filed on Sep. 23, 2002, now Pat. No. 7,090,745.
(60) Provisional application No. 60/410,375, filed on Sep. 13, 2002.

(51) Int. Cl.
*D21H 21/20* (2006.01)
(52) U.S. Cl. ............. 162/164.1; 162/158; 162/164.3; 162/164.6; 162/166; 162/175; 162/178
(58) Field of Classification Search ................. None
See application file for complete search history.

(56) References Cited

U.S. PATENT DOCUMENTS 3,058,873 A 10/1962 Keim (Continued)

FOREIGN PATENT DOCUMENTS

EP 331047 9/1989

(Continued)

OTHER PUBLICATIONS

Kofflin, S.A., et al., "Formation of Hydrogels Using Poly(vinylalcohol)/Poly(vinylamine) Copolymers and D-Glucose," Slides from oral presentation at REU Summer Research Symposium, Aug. 7, 2001.

(Continued)

*Primary Examiner*—Philip C Tucker
*Assistant Examiner*—Michael J Felton
(74) *Attorney, Agent, or Firm*—Bartony & Hare, LLP

(57) ABSTRACT

A composition includes water; at least one hydrophilic polymer containing at least two groups which are independently the same or different a primary amine group or a secondary amine group and at least one saccharide containing a reducible function as described above. The hydrophilic polymer and the saccharide are mixed to form a reaction mixture and reacted to increase the viscosity of the reaction mixture. The reaction is then substantially terminated by reducing the pH of the composition. A method of increasing the strength of a cellulosic pulp product includes the steps of: contacting wet cellulosic pulp with a composition comprising (i) at least one hydrophilic polymer containing at least two groups which are independently the same or different a primary amine group or a secondary amine group and at least one saccharide containing a reducible function, the hydrophilic polymer and the saccharide of the composition having been reacted in a crosslinking reaction prior to contacting the composition with the cellulosic pulp product to increase the viscosity the composition; and, after contacting the cellulosic pulp with the composition, causing the crosslinking reaction between the hydrophilic polymer and the saccharide of the composition to proceed further.

22 Claims, 4 Drawing Sheets

U.S. PATENT DOCUMENTS

| | | | |
|---|---|---|---|
| 3,580,879 A | 5/1971 | Higashimura |
| 3,728,214 A | 4/1973 | Espy |
| 3,744,566 A | 7/1973 | Szabo |
| 3,748,221 A | 7/1973 | Stockmann |
| 3,945,929 A | 3/1976 | Martin |
| 4,039,028 A | 8/1977 | Knight |
| 4,100,079 A | 7/1978 | Sinkovitz |
| 4,152,199 A | 5/1979 | Hamerstrand |
| 4,421,602 A | 12/1983 | Brunnmueller |
| 4,690,219 A | 9/1987 | Burns |
| 4,716,966 A | 1/1988 | Shu |
| 4,774,285 A | 9/1988 | Pfohl |
| 4,788,280 A | 11/1988 | Billmers |
| 4,818,341 A | 4/1989 | Degen |
| 4,830,108 A | 5/1989 | Hazlett |
| 4,834,182 A | 5/1989 | Shu |
| 4,940,514 A | 7/1990 | Stange |
| 4,950,514 A | 8/1990 | Strassheimer |
| 5,262,008 A | 11/1993 | Moench |
| 5,281,307 A | 1/1994 | Smigo |
| 5,380,403 A | 1/1995 | Robeson |
| 5,397,436 A | 3/1995 | Robeson |
| 5,735,349 A | 4/1998 | Dawson |
| 5,789,351 A | 8/1998 | Ahmed |
| 5,846,788 A | 12/1998 | Pedersen |
| 5,851,300 A | 12/1998 | Linhart |
| 6,124,245 A | 9/2000 | Patel |
| 6,127,319 A | 10/2000 | House |
| 6,146,497 A | 11/2000 | Nguyn |
| 6,165,322 A | 12/2000 | Bower |
| 6,179,962 B1 | 1/2001 | Brady |
| 6,465,397 B1 | 10/2002 | Patterson |
| 6,981,552 B2 | 3/2003 | Reddy |
| 6,616,807 B1 | 9/2003 | Dyllick-Brenzinger |
| 6,710,175 B2 * | 3/2004 | Anderson et al. ............. 536/45 |
| 6,803,348 B2 | 10/2004 | Jones |
| 7,004,253 B2 | 2/2006 | Chiappa |
| 2003/0192664 A1 | 10/2003 | Kulick |

FOREIGN PATENT DOCUMENTS

| | | |
|---|---|---|
| GB | 1 259 533 A | 1/1972 |
| WO | WO 98/45536 A | 10/1998 |
| WO | WO 01/29313 A | 4/2001 |
| WO | WO 2004/025027 | 4/2004 |
| WO | WO 2005/089175 | 9/2005 |

OTHER PUBLICATIONS

Kofflin, S.A, et al., "Formation of Hydrogels Using Poly(vinylalcohol)/Poly(vinylamine) Copolymers and D-Glucose," Slides from poster presentation at REU Summer Research Symposium, Aug. 7, 2001.

Kofflin, S.A., "Formation of Hydrogels Using Poly(vinylalcohol)/Poly(vinylamine) Copolymers and D-Glucose," Slides from oral presentation at Saint Mary's College Student Paper Day Presentation, Apr. 23, 2002.

Kofflin, S. A., "Formation of Hydrogels Using Poly(vinylalcohol)/Poly(vinalyamine) Copolymer and D-Glucose," Slides from oral presentation at Saint Mary's Senior Comprehensive, Apr. 11, 2002.

Yamaura, Kazuo et al., Efect of Addition of Saccharides on Gelation of Aqueous Poly (Vinyl Alcohol) Solutions, Journal of Applied Polymer Science. 1999, 74, 1298-1303.

Nestor, S., "Summer Internship Leads to Patent for St. Mary's Senior," Observer Online, Sep. 11, 2001.

Yamaura, Kazuo. et al., Gelation of Poly (vinyl Alcohol) Solutions at Low Temperatures (20 to -78 degrees Celsius) and Properties of Gels. Journal of Applied Polymer Science. 1994, 51, 2041-2046.

* cited by examiner

COMPOSITION FOR INCREASING CELLULOSIC PRODUCT STRENGTH AND METHOD OF INCREASING CELLULOSIC PRODUCT STRENGTH

CROSS-REFERENCE TO RELATED APPLICATION

This application is a continuation in part application of U.S. patent application Ser. No. 10/252,262, filed Sep. 23, 2002 now U.S. Pat. No. 7,090,745, which claims the benefit of U.S. Provisional Patent Application Ser. No. 60/410,375, filed Sep. 13, 2002, the disclosures of which are incorporated herein by reference.

BACKGROUND OF THE INVENTION

The present invention relates generally to crosslinking compositions suitable, for example, to increase the strength (that is, wet and/or dry strength) of cellulosic products (including, for example, paper and other products made from cellulosic pulp) and to methods of increasing the strength of cellulosic products using such compositions.

For many years, the paper-making industry has sought ways of increasing the strength of paper. In that regard, papers fabricated without some additional means of reinforcement thereof can fall apart upon wetting or when subjected to mechanical stress in the dry state. Typically, a material is added to the wet pulp to improve the strength thereof during the formation of sheets prior to ultimate drying. Maintaining paper strength upon wetting is desirable in many applications, including bathroom tissue, paper towels, napkins, and the like. Moreover, additives which increase the strength of a wet paper often increase the dry strength of that paper. Increased dry strength is desirable, for example, in various packaging applications.

A number of wet- and dry-strength increasing additives are known in the art. However, such compositions typically include one or more components which are environmentally unfriendly or even toxic.

For example, some wet-strength additives are condensation products of urea and formaldehyde. Polyamine can be added to make such resins cationic. Other wet-strength additives include organochlorine crosslinked amidoamine compounds. A discussion of wet-strength additives and their mechanisms is presented in "The 65 Mechanism of Wet-Strength Development in Paper: A Review," by Herbert H. ESPY, *Tappi Journal, Vol.* 78, No. 4, pages 90-97 (April 1995 as well as in "Chemistry of Paper Wet-Strength. I. A Survey of Mechanisms of WetStrength Development," by Lars WEST-FELT, *Cellulose Chemistry and Technology, Vol.* 13, pages 813-825 (1979), the contents of which are incorporated by reference as though set forth in full herein.

Chemical compositions purported to increase paper wet strength while being chemically benign or environmentally friendly are set forth in U.S. Pat. No. 6,146,497, which describes a composition including (a) a water-soluble polymeric material comprising at least one nucleophilic polymer, (b) a phenolic compound (phenols or polyphenols) and (c) a component (an oxidizing agent) capable of converting the phenolic compound into a quinone compound. Sugars in conjunction with their corresponding oxidases are contemplated as potential oxidizing agents for the phenolic component of the composition of U.S. Pat. No. 6,146,497. Many phenolic compound, however, are environmentally undesirable. Moreover, many oxidizing agents are also environmentally undesirable (for example, potassium dichromate and potassium permanganate).

It thus remains desirable to develop improved, environmentally friendly compositions for increasing paper wet and/or dry strength.

SUMMARY OF THE INVENTION

In one aspect, the present invention provides a composition comprising at least one hydrophilic polymer containing primary (—$NH_2$) and/or secondary (—NHR) amine groups (that is, hydrophilic polymer contains or includes at least two groups which are independently the same or different a primary amine group or a secondary amine group) and at least one saccharide containing a reducible function. In general, the R substituent upon the secondary amine is not limited. Strong electron withdrawing groups are not preferred as such groups can reduce the nucleophilic nature of the secondary amine. In many cases, R is an alkyl group. The amine groups can be pendant groups on the polymer or incorporated into the polymer backbone. In general, the hydrophilic polymer must include at least two amine groups (per a polymer chain) to enable crosslinking.

Such an amine functional polymer/reducible saccharide combination has been found to undergo an unexpected crosslinking reaction upon the application of heat. The compositions of the present invention can, for example, be used as cross-linking agents in paper strengthening applications. As used herein, the term "polymer" refers to a compound having multiple repeat units (or monomer units) and includes the term "oligomer," which is a polymer that has only a few repeat units. The term polymer also includes copolymers which is a polymer including two or more dissimilar repeat units (including terpolymers—comprising three dissimilar repeat units—etc.). The polymers used in the compositions of the present invention can be homopolymers and/or copolymers.

Hydrogels have found use in the paper industry, for example, as absorbent materials. In that regard, hydrogels have been used as absorbent materials in diapers for a number of years. Surprisingly, the present inventors have discovered that the compositions of the present invention, which form hydrogels, can also be used to increase both the wet strength and dry strength of paper and other cellulosic products. While the hydrophilic polymers of the present invention form hydrogels with reducing sugars in aqueous solution, cross-linking can be controlled (for example, by control of temperature as described below) allowing application of the hydrophilic polymer and the saccharide to wet pulp (that is, paper or cellulosic fibers) and binding to the pulp prior to substantial cross-linking. Typically, a pre-formed hydrogel would not be able to effectively bind to cellulosic fibers as a result of its high viscosity.

Polymers suitable for use in the present invention include, but are not limited to, partially hydrolyzed poly(N-vinylformamide) (that is, a copolymer of NVF and vinylamine), partially hydrolyzed vinyl acetate/NVF copolymer (that is, a polymer with vinyl acetate, vinyl alcohol, NVF and vinylamine repeat units); hydrolyzed acrylonitrile/NVF copolymer; (available as a commercial product from Mitsubishi and containing acrylonitrile, acrylamide, amidine, NVF and vinylamine units), amine functional polyacrylamide (for example, prepared via Hoffman degradation of polyacrylamide), acrylic acid/vinylamine copolymer, maleic anhydride/maleic acid copolymers with NVF/vinylamine, NVF/vinylamine polymers with vinyl sulfonate comonomer units, NVF/vinylamine copolymers with cationic monomers such as diallyldimethylammonium chloride and/or cationic acrylate comonomers, allylamine/diallylamine polymers and copolymers, urea/formaldehyde and melamine/formaldehyde condensation polymers, amidoamine polymers (prepared from dicarboxylic acids and polyfunctional amines), amine/epichlorohydrin polymers, poly(ethyleneimine), and hydrolyzed or partially hydrolyzed poly(2-alkyl-2-oxazoline). One hydrophilic polymer or a mixture of two or more such polymers can be used in compositions of the present invention.

In general, polymers having a broad range of number average molecular weight (Mw) are suitable for use in the present invention. Preferably, the molecular weight of the polymers is at least approximately 500. More preferably, the molecular weight is in the range of approximately 30,000 to approximately 100,000. Polymers having molecular weight in excess of 100,000 can be used, but water solubility can decrease for such polymers as molecular weight increases beyond approximately 100,000.

The reducible saccharides used in the present invention can be monosaccharides, disaccharides, trisaccharides etc, (for example, sugars) or polysaccharides (for example, starch or cellulose). Polysaccharides are typically a combination of nine or more monosaccharides. Reducible saccharides or reducing saccharides include a reducing group, function or functionality which is typically an aldehyde group (—C(O)H) or a hemiacetal group

which is another form of an aldehyde when the saccharide is in a cyclic conformation. Examples of reducing saccharides suitable for use in the present invention include, but are not limited to, the sugars glucose, lactose, and 2-deoxy-D-ribose. To decrease costs, the saccharide is preferably a monosaccharide (for example, glucose), a disaccharide (for example, lactose) or a polysaccharide (for example, starch).

The composition can, for example, further include a base. Examples of suitable bases include, but are not limited to, sodium hydroxide, potassium hydroxide, ammonia or calcium carbonate.

In one embodiment, the polymer is a copolymer of vinyl amine and vinyl alcohol. Preferably, the copolymer is at least 0.5% by weight of vinyl amine. More preferably, the copolymer is at least 3% by weight of vinyl amine. Even more preferably, the copolymer is at least 6% by weight of vinyl amine. Copolymers having well in excess of 6% by weight of vinyl amine are suitable for use in the present invention. In several embodiments for example, copolymer can be at least 12% by weight of vinyl amine.

A broad range of mole ratios of amine to reducing saccharide is suitable for use in the present invention. In one embodiment, the mole ratio of amine groups to reducing saccharide is in the range of approximately 1:4 to approximately 8:1. More preferably, the mole ratio of amine groups to reducing saccharide is in the range of approximately 1:2 to approximately 8:1. In general, increasing amine content results in stiffening of the resultant gel. One skilled in the art can readily determine an appropriate amine content for a desired set of properties for the resultant gel.

In another aspect, the present invention provides a composition including water; at least one hydrophilic polymer containing at least two groups which are independently the same or different a primary amine group or a secondary amine group and at least one saccharide containing a reducible function as described above. In this aspect of the present invention, the hydrophilic polymer and the saccharide are mixed to form a reaction mixture and reacted (that is, crosslinked) until or so that the viscosity of the composition increases. The crosslinking reaction is then substantially terminated (prior to completion) by reducing the pH of the composition (for example, by adding an acid such a aqueous hydrochloric acid). The viscosity of the composition can, for example, be at least 20 cp at 80° C. when the crosslinking reaction is terminated. In one embodiment, the viscosity of the composition is in the range of approximately 20 cp to 100 cp at 80° C. when the reaction is terminated. The viscosity of the composition can further, be in the range of approximately 20 cp to 60 cp at 80° C. when the reaction is terminated. The viscosity of the composition can also be in the range of approximately 20 cp to 40 cp at 80° C. when the reaction is terminate. Preferably, the viscosity of the reduced pH composition is no greater than 80 cp at room temperature (that is, approximately 22° C.).

The pH of the composition can, for example, be greater than 7 during reaction and reduced to less than 7 to substantially terminate the reaction. Preferably, the pH of the composition is at least 10 (and, more preferably, in the range of approximately 10 to 12) during reaction and reduced to 6 or less to substantially terminate the reaction. In one embodiment, the pH of the composition is reduced to a pH in the range of approximately 4 to 6 to substantially terminate the reaction. In another embodiment, the pH of the composition is reduced to a pH in the range of approximately 5 to 6 to substantially terminate the reaction. The compositions of the present invention can be stored for extended periods of time at a pH of 6 or less (and, for example, at room temperature) prior to causing further crosslinking (for example, in the strengthening of paper).

In another aspect, the present invention provides a method of increasing the strength of a cellulosic product including the step of contacting a wet cellulosic pulp with a composition as described above. In one embodiment, wet cellulosic pulp (for example, wet paper pulp) and the composition are contacted at a temperature below approximately 50° C., or more typically, at room temperature or below (that is, at approximately 25° C. or below) and subsequently heated to induce crosslinking. For example, the cellulosic pulp and the composition can be heated to a temperature of at least 50°, at least 70° or at least 90°.

In still a further aspect, the present invention provides a method of increasing the strength of a cellulosic pulp product including the steps of: contacting wet cellulosic pulp with a composition comprising (i) at least one hydrophilic polymer containing at least two groups which are independently the same or different a primary amine group or a secondary amine group and at least one saccharide containing a reducible function, the hydrophilic polymer and the saccharide of the composition having been reacted in a crosslinking reaction prior to contacting the composition with the cellulosic pulp product to increase the viscosity the composition; and, after contacting the cellulosic pulp with the composition, causing the crosslinking reaction between the hydrophilic polymer and the saccharide of the composition to proceed further.

In one embodiment, prior to contacting the wet cellulosic pulp with the composition, the hydrophilic polymer and the saccharide are mixed to form a reaction mixture and reacted (that is, crosslinked) until the viscosity of the composition increases. The reaction is then substantially terminated by reducing the pH of the composition as described above. Upon addition of such compositions to wet cellulosic pulp, a further crosslinking (and a resultant further increase in viscosity) is promoted by a basic environment and heating. After addition of the composition to the wet cellulosic pulp and further crosslinking, the wet cellulosic pulp is dried to form a cellulosic pulp product (for example, paper, tissue, cardboard etc.).

In still another aspect, the present invention provides a composition formed from a mixture of water, cellulosic pulp, at least one hydrophilic polymer containing at least two groups which are independently the same or different a primary amine group or a secondary amine group and at least one saccharide containing a reducible function.

The compositions and methods of the present invention substantially increase both the wet and dry strength of paper and other cellulosic products. The compositions can also be used as, for example, strengthening additives in other materials. The compositions of the present invention can be added to the cellulosic fibers as individual components or as a pre-gel made by the partial reaction of the polymer(s) or copolymer(s) and the reducible saccharide component(s). No oxidizing agents, phenolic compounds, formaldehyde or organohalo compounds are required in the compositions and methods of the present invention. In general, no environmentally undesirable components are used in the compositions and methods of the present invention.

DETAILED DESCRIPTION OF THE INVENTION

Figure 1:
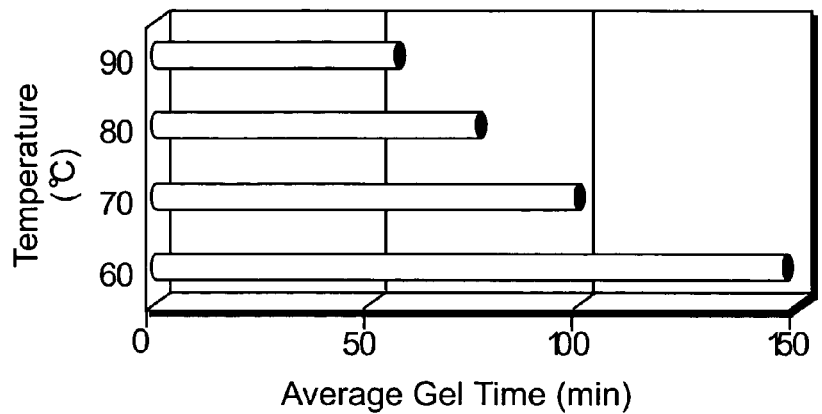
FIG. 1 illustrates a study of gel time at various temperatures for a composition including a copolymer of vinyl amine and vinyl alcohol (6 wt % vinyl amine) and D-glucose at a 1:1 sugar/copolymer ratio.

As discussed above, during paper processing, material is added to the wet pulp to improve the strength during the formation of sheets prior to ultimate drying. Preferably, the additive material or composition exhibits a relatively low viscosity during addition (to fully absorb into the pulp), then cures as temperature increases. Because paper comes into intimate contact with people, the strength-enhancing material is preferably relatively environmentally benign.

In the present invention, environmentally friendly or benign compositions are used to increase the wet strength (as well as the dry strength) of paper. When individual polymer chains interact, chemical or physical crosslinking may occur. This crosslinking results in a three-dimensional highly branched network of polymers.

When these networks become swollen with water they form hydrophilic gels, known as hydrogels. Hydrogels possess unique physical properties having attributes of both solids and liquids. Solid-like properties can be attributed to the strength of the crosslinked polymer networks. Whereas, fluid like properties result from the fact that the hydrogel is typically composed of over 80% water. The dual nature of their physical properties makes hydrogels particularly interesting and useful, in both industry and research.

The present inventors have discovered that water soluble polymers having primary and/or secondary amine groups undergo a crosslinking reaction in the presence of a reducing saccharide such as a reducing sugar. Reducing sugars are sometimes referred to herein simply as sugars.

Several examples of the present invention are described using compositions including polymers with vinyl amine repeat groups and at least one of several reducing sugars. Vinyl amine homopolymer was found to form crosslinked polymer networks or gels in the presence of a reducing sugar. Moreover, copolymers of vinyl amine and at least one other monomer were also found to form crosslinked polymer networks or gels in the presence of a reducing sugar. In many instances, use of a copolymer of vinyl amine and at least one other monomer is preferable to use of a vinyl amine homopolymer in the present invention given the expense of the vinyl amine monomer. In a number of studies of the present invention, representative copolymers of vinyl amine and vinyl alcohol were used. Such copolymers are also sometimes referred to herein as poly(vinylalcohol)/poly(vinylamine) or PVOH/PVAm copolymers.

Aqueous solutions of poly(vinylalcohol)/poly(vinylamine) copolymer and a number of sugars were found to gel readily at temperatures between approximately 50 and 100° C. In a series of initial experiments, known amounts of sugars were mixed with a copolymer of vinyl amine and vinyl alcohol (12 wt % vinyl amine) to form a 40% solution (in water) by weight. The mixtures were heated to various temperatures and held for varying lengths of time. Gelation was determined to be the point where a Teflon stir bar ceased to move.

Vinyl amine is required for gelation to occur. In that regard, homopolymers of vinyl alcohol did not gel in the presence of sugar at elevated temperature. Homopolymers of vinyl amine or copolymers of vinyl amine and vinyl alcohol gelled readily under these conditions. Reducing saccharide (for example, sugar) is also required for gelation—vinyl amine homopolymers and copolymers of vinyl amine and vinyl alcohol did not gel without the presence of sugar. Gelation occurs over a wide range of amine:sugar (saccharide) ratios.

Gelation occurred in the presence of 2-deoxy-D-ribose, suggesting that the osazone mechanism was not responsible for crosslinking. On the other hand, gelation did not occur when using sucrose, suggesting that Maillard chemistry (known from food chemistry) is involved in the crosslinking and hence gelation. Prior studies suggest that no mutagenicity results from products of the Maillard reaction when disaccharides are employed. Lactose, for example, allows for gelation in the compositions and systems of the present invention. Although it is believed that the Maillard chemistry is involved in gelation in the compositions of the present invention, the present invention is not limited to any particular mechanism of gelation.

Figure 2:
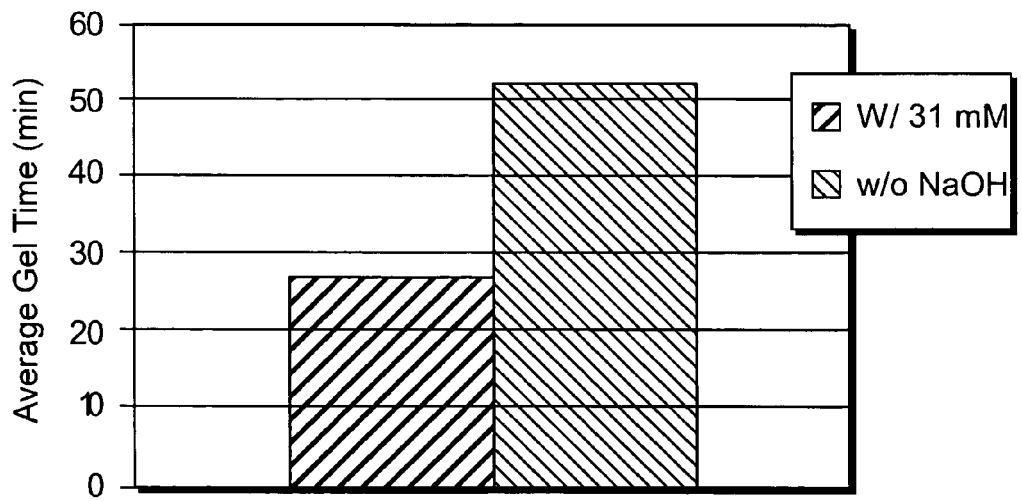
FIG. 2 illustrates the effect of addition of base upon gel time.

Increasing temperature increases the rate of the reaction/gelation. In several experiments with a 12% (wt) amine sample, for example, the time for gelation dropped with increasing temperature from 335 minutes (50° C.) to 113 minutes (60° C.) to 50 minutes (70° C.) to 24 minutes (80° C.) to less than 10 minutes at (90° C.). FIG. 1 illustrates graphically the effect of increasing temperature on gel time for a copolymer of vinyl amine and vinyl alcohol having 6% (wt) vinyl amine. Addition of acid (for example, $H_2SO_4$) slowed the gelation reaction, while addition of a base (for example, NaOH) accelerated the gelation reaction (see FIG. 2).

Figure 3:
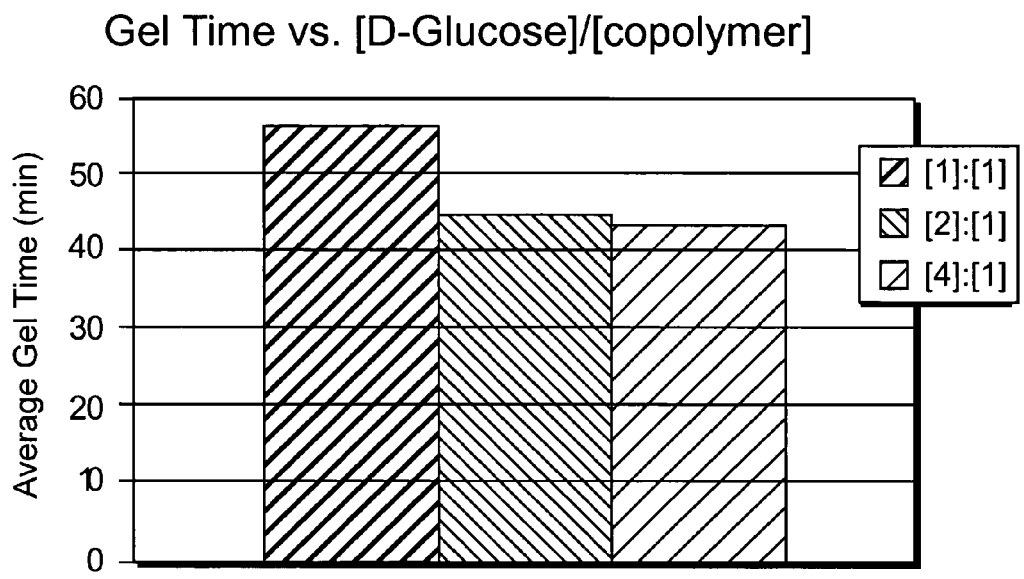
FIG. 3 illustrates a study of gel time at various sugar:copolymer ratios for a composition including a copolymer of vinyl amine and vinyl alcohol and D-glucose.
Figure 4:
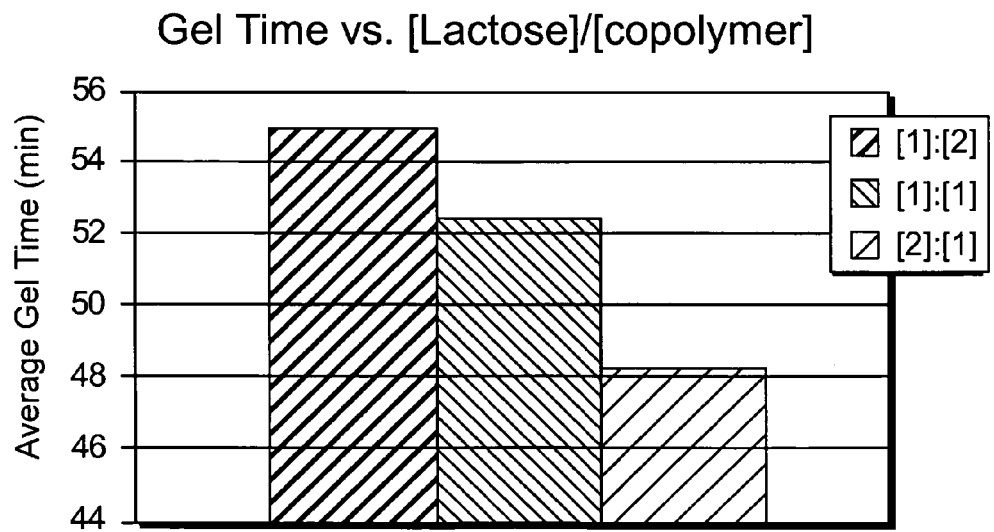
FIG. 4 illustrates a study of gel time at various sugar:copolymer ratios for a composition including a copolymer of vinyl amine and vinyl alcohol and lactose.
Figure 5:
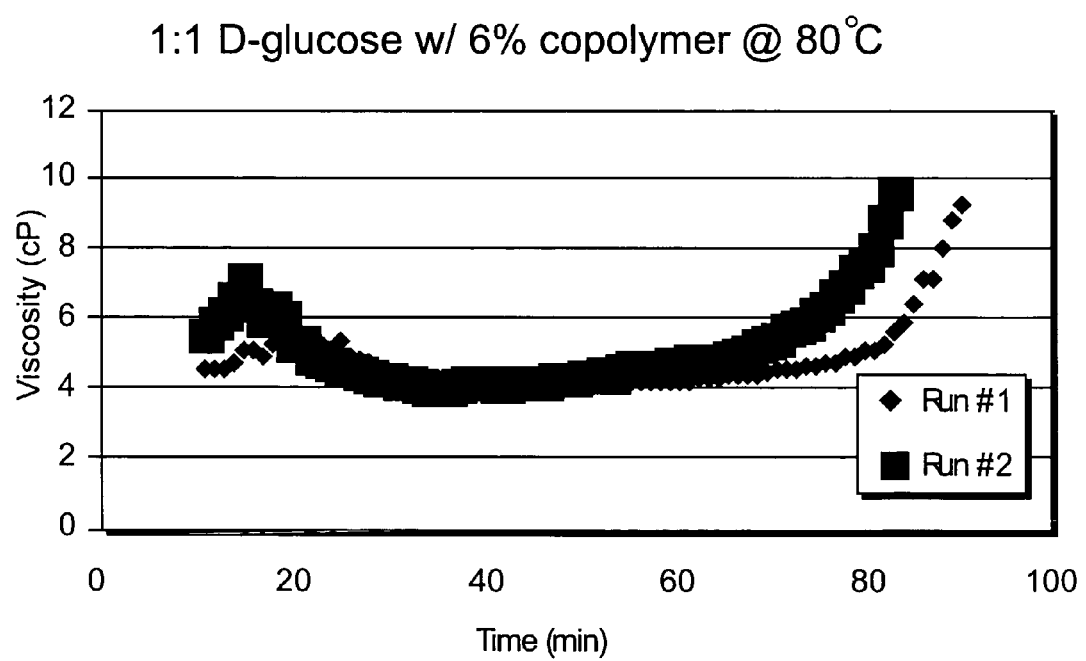
FIG. 5 illustrates the viscosity of a composition including a copolymer of vinyl amine and vinyl alcohol (6 wt % vinyl amine) and D-glucose at a 1:1 sugar/copolymer ratio as a function of time.

FIGS. 3 and 4 illustrate studies of the effect of mole ratio of sugar to copolymer (6% by weight amine) for D-glucose and lactose, respectively. In general, sugar concentration only slightly effected gel time. Moreover, the type of sugar used did not greatly affect gelation time. Lactose was found to be slightly better than D-glucose in these studies.

A number of experiments were performed to explore the ability of the gel to strengthen wet paper, as summarized below. The PVOH/PVAm:glucose 2:1 sample clearly showed improved wet strength over PVOH/PVAm without sugar and is substantially superior to the control paper and to glucose coated paper. These results demonstrate the effectiveness of the compositions of the present invention in improving the wet strength and the dry strength of paper. The temperature dependence of the rate of cross-linking of the compositions of the present invention allows time to apply the relatively low-viscosity mixtures of hydrophilic polymer and reducing saccharide of the present invention to pulp fibers, with strength properties developing in the finished sheet. Dehydration readily occurs in the paper sheet upon drying to form a strengthening cross-linked matrix.

In the experiments of Tables 1 and 2, a sample of PVOH/PVAm (12 wt % vinyl amine; medium molecular weight) was dissolved at 4 wt % in distilled water. A sample of glucose was also dissolved at 4 wt % in distilled water. These samples were applied to Whatman #4 filter paper to provide even coverage.

TABLE 1

Dry Result

| Sample Description | Coat Weight (weight of coating/ weight of paper) | Dry Strength (lbs) |
| --- | --- | --- |
| Control Paper | 0 | 5.43 |
| PVOH/PVAm | 0.124 | 15.3 |
| Glucose | 0.137 | 4.1 |
| PVOH/PVAm:glucose 2:1 | 0.118 | 11.7 |

TABLE 2

Wet Results

| Sample Description | Coat Weight (weight of coating/ weight of paper) | Wet Strength (lbs.) |
| --- | --- | --- |
| Control Paper | 0 | 0.095 |
| PVOH/PVAm | 0.085 | 0.81 |
| Glucose | 0.134 | 0.128 |
| PVOH/PVAm:glucose | 0.081 | 3.26 |

In several other experiments, a sample of PVOH/VAm (12 mole % vinyl amine repeat units) was dissolved at 6 wt % in distilled water. In these experiments, the composition including the hydrophilic polymer PVOH/PVAm and a reducing sugar (for example, D-glucose) was reacted prior to contact with a wet cellulosic pulp to first increase the viscosity of the composition. Increasing the viscosity of the composition can, for example, result in better binding of the composition to the wet cellulosic pulp. The crosslinking reaction can be terminated prior to completion by, for example, reducing the pH of the composition through the addition of an acid. Preferably, the pH of the composition is reduced to a pH in the range of 4 to 6. It was discovered that, the compositions of the present invention can be stored for extended periods of time at a pH of 6 or less without substantial further crosslinking reaction. Upon addition of such compositions to wet cellulosic pulp, a further crosslinking (and a resultant further increase in viscosity) is promoted by a basic environment and heating. The compositions of the present invention can, for example, be added to wet cellulosic pulp in the range of approximately 0.05 to 2 wt % on the basis of the weight dry cellulosic pulp. The compositions of the present invention can also be added in the range of approximately 0.1 to 1 wt % based upon the weight of the dry cellulosic pulp. The compositions of the present invention can further be added in the range of approximately 0.1 to 0.5 wt % based upon the weight of the dry cellulosic pulp.

Experimental

Materials. All chemicals were used without further purification. Poly(vinylalcohol) (98-99%, $M_w$ 31,000-50,000), D-glucose (A.C.S. reagent) and 2-deoxy-D-ribose (97%) were purchased from Aldrich Chemical Co. Sucrose (A.C.S. reagent) was purchased from J. T. Baker Chemical. Lactose (A.C.S. reagent) was purchased from E.M. Science. L-ribose (99.5%) was purchased from Acros Organics. The poly(vinylalcohol)/poly(vinylamine) copolymers (6 and 12% amine, medium $M_w$) were donated by Air Products and Chemicals Inc.

Instrumentation. Infrared spectra (IR) were obtained on an ATI Mattson FTIR spectrometer. Information obtained was used to determine chemical changes occurring during gelation.

Synthesis of poly(vinylamine). Poly(vinylamine) was synthesized using N-vinyl formamide (NVF). First poly(vinylformamide) (PNVF) was made by combining 100 mL of the NVF monomer, 40 mL of DMSO solvent, 61 mg Vazo 88 initiator (cyclohexane carbonitrile), and 0.5 g RAFT agent in a three-neck flask. The mixture was then heated at 100° C. for ~2 hours under nitrogen gas with constant stirring and with reflux conditions. After heating, the product was diluted in a 50 mL/50 mL water/ethanol mixture. The product was then precipitated out of solution using acetone. Product was dried overnight in a vacuum oven, redisolved in a 120 mL/50 mL water/ethanol mixture and subsequently precipitated using acetone. The PNVF was hydrolyzed under basic conditions by combining the polymer, concentrated NaOH (5% excess) and distilled deionized water in a round bottom flask. The mixture was then heated at 80° C. for 18 hours, under reflux conditions and with constant stirring. Adding HCl to the cold product solution precipitated the product. The product was then washed with methanol three times and dried in a vacuum oven. HCl was removed by adding aqueous NaOH. This product was precipitated in acetone, dried and then washed with butanol.

EXAMPLES

Example 1

An aqueous solution was prepared by dissolving 7.5 g D-glucose and 2.5 g poly(vinylalcohol) (PVOH) into distilled, deionized water in a 25 mL volumetric flask. The solution was clear with some undissolved polymer. It was, however, pourable. The solution was transferred to a round bottom flask and heated to 80° C. in an oil bath. Heating was done with constant stirring and under reflux conditions. Upon completion the solution remained clear with all polymer dissolved and was still pourable.

Example 2

Prior studies suggest that an aqueous solution of PVOH and D-glucose could be used to form hydrogels by using freezing/thawing cycles. See Yamaura, K.; Fukada, M.; Tanaka, T.; Tanigami, T. *J. of Applied Polymer Science.* 1999, 74, 1298-1303. To study this effect, a solution was prepared as in example 1. Heating was carried out using the same procedure as in example 1, but was allowed to reach a temperature of 90° C. The aqueous solution was then placed in a −10° C. freezer over 48 hours. After thawing the solution at room temperature for 1 hour a weak, white hydrogel had formed. The gel was then placed back in the freezer for 24 hours and then thawed at room temperature for 1 hour. After which, the gel appeared visibly stronger. This gel was found to be soluble in water heated up to 49° C. Neither swelling nor dissolution was noted when placed in 1M HCl.

Example 3

Prior studies further suggest that D-glucose was not necessary for the gelation of poly(vinylalcohol) using the process in example 2. See Yamaura, K.; Karasawa, K. I.; Tanigami, T.; Matsuzawa, S. *J. of Applied Polymer Science.* 1994, 51, 2041-2046. To study such gelation, a 2.5 g of PVOH was dissolved in distilled, deionized water in a 25 mL volumetric flask. Heating was carried out using the same procedure as in example 1, but was allowed to reach a temperature of 95° C. The solution was then placed in the freezer at −25° C. for 48 hours. After 1 hour of thawing at room temperature a gel, similar in appearance to the gel in Example 2, was produced. The inability of PVOH to form hydrogels without the freezing/thawing cycle indicated that the amine groups on copolymers of PVOH and Poly(vinylamine) in the compositions of the present invention are responsible for gelation.

Example 4

Poly(vinylamine) (PVA) was also used in trying to make gels. An excess of PVA was used in the case that some butanol was still present in the synthesized polymer. 2.8 g of PVA was dissolved in distilled, deionized water in 25 mL volumetric glassware leaving room for the addition of D-glucose and more water. A heating gun was used, as needed, to dissolve polymer. D-glucose was dissolved in some water in a separate container, added to the other solution and diluted as necessary. This solution was orange in color and pourable. Heating was carried out using the same procedure as in example 1, but was allowed to reach a temperature of 100° C. A rubbery, dark brown gel began to appear at ~95° C. This gel swelled when exposed to both excess water and 1M HCl.

Example 5

To ensure that the discoloration observed in Example 4 was a result of gelation and not merely oxidation of the amine, Example 4 was repeated under nitrogen gas. This was done using a three neck flask, rubber septum and needle. The rubbery, dark brown gel appeared at ~93° C. again. This gel was slightly lighter in color than the gel of Example 5. This gel swelled in water and in 1M HCl.

Example 6

To study whether a sugar was necessary for gelation, 1.25 g of PVA was dissolved in water in a 25 mL volumetric flask. This solution was then heated to 95° C. using the procedure of Example 1. No gelation was observed.

Example 7

The poly(vinylalcohol)/poly(vinylamine) copolymer that was used for the experiments set forth in Examples 7 through 24 contained 12% amine groups. 2.5 g of the copolymer followed by 7.5 g of D-glucose were dissolved in distilled deionized water using the procedure outlined in Example 4. This solution was then transferred to a three-neck flask and heated in an oil bath to 100° C. Heating was carried out under reflux conditions, with constant stirring and under argon gas. A strong, bright yellow gel appeared at ~90° C. This gel swelled when exposed to excess water and to 1M HCl.

Example 8

The procedure in example 7 was repeated using 2.5 g D-glucose. This is a 1:2 mole ratio of amine groups to sugar molecules. Gelation began to occur at ~90° C. This gel was strong and yellow. It swelled in water and 1M HCl.

Example 9

The procedure of Example 7 was repeated using 1.25 g D-glucose (a 1:1 mole ratio of amine groups to sugar molecules). Gelation began to occur at ~90° C. This gel was a pale yellow color. This gel is still strong but not as strong as the previous two examples. Swelling was noted in water and 1M HCl. IR spectra were taken of the aqueous solution before heating and of this gel afterwards. Before heating a strong peak was seen around 1680 cm$^{-1}$, which is typical of a primary amine peak. After heating this peak became much smaller, more typical of a secondary amine. Another unidentified peak appeared after heating at ~1090 cm$^{-1}$.

Example 10

The procedure of Example 7 was repeated using 0.61 g D-glucose (a 2:1 mole ratio of amine groups to sugar molecules). Gelation began to occur at ~95° C. This gel was strong yet somewhat sticky and a clear yellow color. Swelling was noted when exposed to water and to 1M HCl.

Example 11

The procedure of Example 7 was repeated using 0.31 g D-glucose (a 4:1 mole ratio of amine groups to sugar molecules). Gelation began to occur at ~100° C. The gel produced was sticky and almost clear in color. This gel swelled when exposed to excess water and to 1M HCl.

Example 12

The procedure of Example 7 was repeated using 0.16 g D-glucose (a 8:1 mole ratio of amine groups to sugar molecules). Gelation began to occur at ~100° C. This gel was sticky and clear. Swelling occurred when exposed to water and to 1M HCl.

Example 13

To test for the possibility of an osazone mechanism L-ribose was used instead of D-glucose. The procedure followed was similar to that of example 9 (using a 1:1 mole ratio and the same conditions). 1.02 g of L-ribose was used. Gelation occurred at ~85° C. This gel was strong, sticky and bright orange in color. This gel swelled when exposed to excess water and to 1M HCl.

Example 14

As part of the aforementioned test of reaction mechanism 2-deoxy-D-ribose was also used instead of D-glucose. The procedure of Example 9 was once again followed, this time using 0.91 g of 2-deoxy-D-ribose. Gelation occurred at ~85° C. This gel was also strong and bright orange. The gelation of 2-deoxy-D-ribose indicates that the osazone reaction is not taking place since it would be unable to occur as a result of the structure of this sugar. Without limitation to any particular reaction mechanism in the present invention, a Maillard reaction mechanism is thus indicated. The gel of this example swelled when exposed to excess water and to 1M HCl.

Example 15

Figure 6:
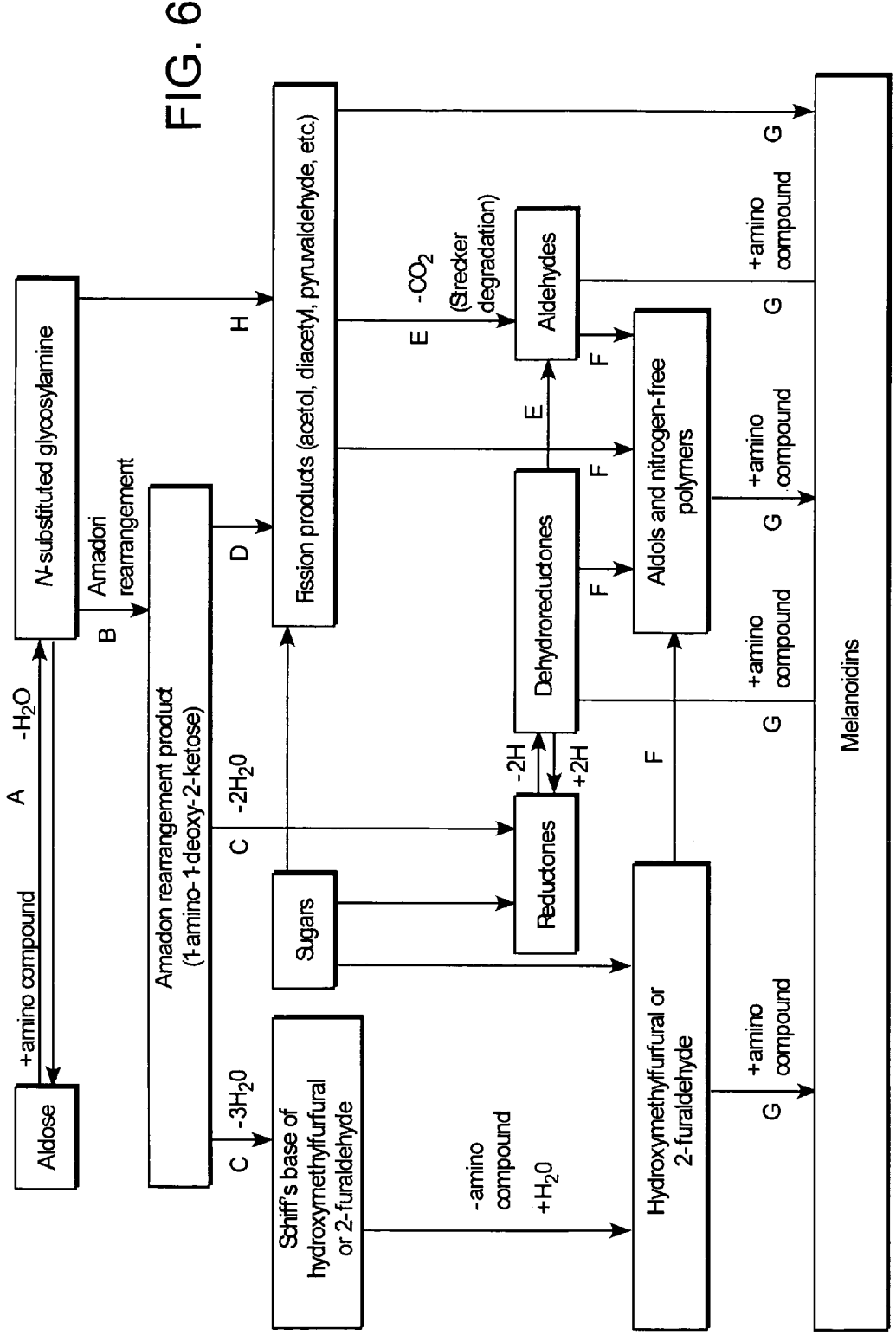
FIG. 6 sets forth a schematic representation of a Maillard reaction.

Prior studies show that little or no mutagenicity results from the Maillard reaction when disaccharides, such as lactose, are involved. See, for example, Brands, C. M. J.; Alink, G. M.; vanBoekel, M. A. J. S.; Jongen, W. M. F. *J. Agric. Food Chem.* 2000, 48, 2271-2275. A summary of the Maillard reaction is provided in FIG. 6. Thus lactose is a good sugar for use in the present invention. The procedure of Example 9 was used, with 2.45 g of lactose. A strong, orange gel formed at ~100° C. Solubility tests were not carried out on this gel.

Example 16

Sucrose is a disaccharide lacking active carbonyl groups. Therefore, sucrose would not be able to form a gel via the Maillard reaction. See Baynes, J. W.; Monnier, V. M. "The Maillard Reaction in Aging, Diabetes and Nutrition" 1989; and O'Brien, J.; Nursten, H. E.; Crabbe, M. J. C.; Ames, J. M. "The Maillard Reaction in Foods and Medicine" 1998. The procedure from example 9 was once again repeated. In this example, time 2.33 g of sucrose was used. The temperature was taken up to 115° C. and gelation was not observed.

Example 17

Constant temperature experiments were also carried out. 2.5 g of copolymer followed by 1.25 g of D-glucose were dissolved in water using a 25 mL volumetric flask as outlined in Example 4. Heating took place in an oil bath that was maintained at a constant temperature of 80° C. Heating was done under reflux conditions, under argon gas and with constant stirring. Gelation time was noted as the time when the gel became too viscous for the stir bar to move. In this example gelation time was found to be 23.5 minutes. The gel produced was a clear yellow and sticky. This gel dissolved in water.

Example 18

The procedure of Example 17 was repeated using an oil bath at 70° C. Gelation time was noted as 49.5 minutes. This gel was weaker and stickier than the previous one. This gel also dissolved in water.

Example 19

The procedure of Example 17 was repeated using an oil bath at 60° C. Gelation time was noted as 113.25 minutes. This gel was weaker and stickier than the previous one. This gel also dissolved in water.

Example 20

The procedure of Example 17 was repeated using an oil bath at 50° C. Gelation time was noted as 335.0 minutes. This gel was weaker and stickier than the previous one. This gel also dissolved in water.

Example 21

To test the effect of pH on gelation, the procedure of Example 17 was repeated under acidic conditions. Three drops of concentrated $H_2SO_4$ were added to the aqueous solution. After 120.0 minutes the solution had turned slightly yellow and appeared to be a pourable gel. This gel was also soluble in water.

Example 22

Basic conditions were also examined using the procedure in example 17. 0.04 g of concentrated NaOH were added to the aqueous solution. Gelation was noted after 18.2 minutes. This gel was similar in appearance to that produced in Example 17. This gel was slightly soluble in excess water.

Example 23

The gels studied in FIGS. 1 through 5 were synthesized in a consistent manner. In that regard, 21.25 grams of copolymer was weighed out into a beaker and set aside for both 6 wt % and 12 wt % amine copolymers. The sugar was also weighed out in a beaker and set aside. The amount of sugar added depended on the mole ratio of sugar to amine, which is indicated in Table 3 below for each ratio.

TABLE 3

| Molar Ratio (sugar:amine) And Type of Sugar | Amount of Sugar (grams) |
|---|---|
| 1:1 glucose | 5.23 |
| 2:1 glucose | 10.46 |
| 4:1 glucose | 20.92 |
| 1:2 lactose | 5.23 |
| 1:1 lactose | 10.46 |
| 2:1 lactose | 20.92 |

The saccharide (sugar):amine rations set forth in Table 3 and FIGS. 3 and 4 are merely the reciprocal of amine:sugar mole ratios.

Deionized water was measured out in a tall form beaker to approximately 425 mL. A small amount (~¼) of this water was put into another tall form beaker and the sugar was added and mixed thoroughly. The bulk of the water was used to mix with the copolymer. The mixture of copolymer/water was then put into an oil bath and mixed to allow the copolymer to dissolve. Next, the sugar/water mixture was added into the copolymer mixture and the time was started. The UL adapter was then lowered into the mixture and the Brookfield viscometer was turned on to a speed of 60 (The Brookfield viscometer had been earlier calibrated with water). The readings form the Brookfield were not recorded until after the time had reached 9 minutes to allow the UL adapter to settle. The time was then recorded after each minute. The only other change in procedure occurred when the NaOH was added [50% (w/w/) NaOH in water solution]. 31 mM of NaOH (or 1 gram of the NaOH in water solution) was added into the sugar/water mixture before adding it to the copolymer mixture.

Example 24

In several studies of the effect of the compositions of the present invention upon wet and dry strength of paper, a sample of PVOH/PVAm (12 wt % VAm; medium molecular weight) was dissolved at 4 wt % in distilled water. A sample of glucose was also dissolved at 4 wt % in distilled water.

These samples were applied to Whatman #4 filter paper from a 6" roll using a wire wound rod (RDS40) to provide even coverage. 50 grams of the 4 wt % solution of PVOH/PVAm were mixed with 25 grams of the 4 wt % solution of glucose and also coated on the above noted filter paper using a wire wound rod to provide even coverage. The samples were placed in an air circulating oven for 10 minutes at 100° C. The samples were removed and conditioned at 23° C.; 50°/" RH for 16 hours prior to testing. 1" wide strips were cut transverse to the filter paper roll direction and cut into two 3" long specimens for dry tensile testing. Samples were also cut into 3" long specimens and immersed in water for 30 seconds and tested for wet tensile strength. The results are set forth in Table 1 and 2 above. The sample weights were measured to determine coat weights (amount of additive on the coated paper versus the uncoated paper). Data on an average of four specimens is set forth in Tables 1 and 2. The testing rate was 2 in./min. strain rate (2 in. gage length).

Example 25

The polymer used in this example and the following examples was a copolymer of vinyl alcohol and vinylamine (PVOH/VAm), containing 12 mole % vinylamine repeat units, with a medium molecular weight. Although any reducing sugar may be used, D-glucose was used in this and the following examples. Twelve (12) grams of PVOH/VAm were dissolved in 200 grams of water. The solution was heated to 90° C. and then filtered to remove any insoluble material. With the solution temperature maintained at 80° C., six grams of D-glucose was added, followed by sufficient 30% sodium hydroxide solution to bring the solution pH to at least 10, preferably approximately 12. With continued heating in the 80-90° C. range the solution converts to a thick viscous gel. The relationship between time to gelation and temperature is illustrated in Table 4 for the crosslinking of PVOH/VAm with D-glucose at a 1:1 mole ratio and a pH of 12.5.

TABLE 4

| Temperature (° C.) | Time to gelation |
| --- | --- |
| 22 | 66 hours |
| 30 | 28 hours |
| 40 | 22 hours |
| 50 | 5 hours |
| 60 | 40 minutes |
| 80 | 10-20 minutes |

Example 26

As in Example 25, twelve grams of PVOH/VAm were dissolved in 200 grams of water, heated to 90° C. and filtered to remove insoluble material. Maintaining the solution temperature at 80° C., six grams of D-glucose were added, followed by sufficient 30% aqueous sodium hydroxide to bring the solution pH to at least 10. The initial viscosity was 17 cps. After approximately twenty minutes at 80° C., the viscosity had risen to 40 cps. Once the viscosity reached 40 cps, the solution pH was adjusted to 6 by addition of 33% hydrochloric acid solution. The viscosity was measured as 22 cps at 80° C. and 80 cps at 23° C. The solution does not gel and can be stored at room temperature for several weeks without any evidence of gel formation.

Example 27

A dynamic handsheet maker (Techpap) was employed to make paper samples for testing. Sixteen (16) grams of dry cellulosic fiber were used to make a slurry in water at 1% consistency. The pH of the slurry was adjusted to the desired level and the acid-stabilized PVOH/VAm/D-glucose from Example 26 added at a level of 0.5 weight % (equivalent to 10 lb/ton) based on the amount of dry fiber in the slurry. The rotation speed of the handsheet maker was set at 680 rpm and pressure applied to form the paper sheet. The wet paper web was pressed and dried at 115° C. for eight minutes. The paper sheets were conditioned at 23° C. and 50% relative humidity for one day. The treated paper sheets were then tested for wet tensile, dry tensile and burst strength using standard tests. The results were normalized to allow for differences in thickness and grammage for each sheet.

Example 28

Paper sheets were made up as in Example 27, both with and without the polymer additive. The PVOH/VAm/D-glucose solution was heated for 30 minutes at 80° C. before adding to the fiber suspension. The final viscosity (at room temperature) was 80 cps. The results are summarized in Table 5.

TABLE 5

| Additive | None | PVOH/VAm/D-glucose |
| --- | --- | --- |
| pH | 5.5 | 5.5 |
| DBL (km) | 3.646 | 4.173 |
| WBL (km) | 0.054 | 0.332 |
| WBL/DBL (%) | 1.5 | 8.00 |

In Table 5, "DBL" refers to Dry breaking length, while "WBL" refers to Wet breaking length Example 29

Paper sheets were made as in Example 27, using the PVOH/VAm both with and without added D-glucose. The copolymer/glucose solution was heated at 80° C. for 30 minutes before use and the final viscosity at room temperature was 68 cps. The results are summarized Table 6.

TABLE 6

| Additive | None | PVOH/VAm | PVOH/VAm/D-glucose |
| --- | --- | --- | --- |
| pH | 5.5 | 8 | 8 |
| DBL (km) | 3.646 | 3.934 | 3.912 |
| WBL (km) | 0.054 | 0.326 | 0.361 |
| WBL/DBL (%) | 1.50 | 8.30 | 9.20 |

Example 30

Paper sheets were made as in Example 27, both with and without polymer additive. The PVOH/VAm/D-glucose was heated at 80° C. until a final viscosity of 225 cps (as measured at room temperature) was reached. The results are summarized in Table 7.

TABLE 7

| Additive | None | PVOH/VAm/D-glucose |
| --- | --- | --- |
| pH | 5.5 | 5.5 |
| DBL (km) | 3.646 | 4.39 |
| WBL (km) | 0.054 | 0.352 |
| WBL/DBL (%) | 1.50 | 8.01 |

Example 31

Paper sheets were made as in Example 27, both with and without polymer additive. The PVOH/VAm/D-glucose samples were heated for different times at 60° C. prior to use. The results are summarized in Table 8.

TABLE 8

| Additive | None | PVOH/ VAm/D-glucose | PVOH/ VAm/D-glucose | PVOH/ VAm/D-glucose |
|---|---|---|---|---|
| Reaction Time (mins) | — | 12 | 22 | 33 |
| Viscosity (cps) | — | 53 | 71 | 83 |
| pH | 5.5 | 5.5 | 5.5 | 5.5 |
| DBL (km) | 3.291 | 3.37 | 3.638 | 3.61 |
| WBL (km) | 0.051 | 0.357 | 0.373 | 0.367 |
| WBL/DBL (%) | 1.5 | 10.6 | 10.3 | 10.2 |

Example 32

A paper-making trial was conducted on a pilot-scale paper machine. The machine used was a Fourdrinier (width 25 inches), with a nominal paper output of 160 lbs paper per hour. The pulps used were old corrugated containers (OCC) and a mix of OCC with recycled newsprint. Polymer was added in the range of 2-10 lbs/ton on a dry basis. Sample sheets were cut from the paper reel and conditioned in the same fashion as the hand-sheets in Example 27. Results were normalized for thickness and weight. The PVOH/VAm solution was prepared as in Example 26, filtered and stored in a drum. D-glucose was added to this stock solution, pH adjusted to 12 and the solution was then heated to 80° C., while monitoring viscosity. Measured viscosities were below 100 cps during use of the solution.

Example 33

Paper was made on the pilot machine using old corrugated containers (OCC) as the fiber source. The paper produced was 26-28 lbs per 1,000 square feet, with a caliper of approximately 9.0. A base sheet was produced with no additive. Then PVOH/VAm/D-glucose (P) was fed to the paper stock at a rate to give a 2 to 10 lb per ton (0.1-0.5%) application level on a dry basis. Results are summarized in Table 9. Properties reported were measured in the machine direction.

TABLE 9

| Additive | None | P (0.1%) | P (0.2%) | P (0.3%) | P (0.4%) | P (0.5%) |
|---|---|---|---|---|---|---|
| DBL km | 6.407 | 6.469 | 6.005 | 6.402 | 5.903 | 5.917 |
| WBL (km) | 0.38 | 0.25 | 0.45 | 0.50 | 0.47 | 0.51 |
| WBL/DBL (%) | 5.9 | 3.9 | 7.5 | 7.8 | 8.0 | 8.5 |
| Burst Index | 2.683 | 2.878 | 2.804 | 2.787 | 2.711 | 2.597 |

Example 34

Paper was made as in Example 33, but using a mixture of OCC and old newsprint as fiber source. A base sheet was produced with no additive. Then PVOH/PVAm/D-glucose (P) was added at levels sufficient to give 6 and 8 lb/ton (0.3 and 0.4%) application levels. Properties reported were measured in the machine direction and are summarized in Table 10.

TABLE 10

| Additive | None | P (0.3%) | P (0.4%) |
|---|---|---|---|
| DBL (km) | 5.598 | 5.654 | 5.715 |
| WBL (km) | 0.19 | 0.35 | 0.52 |
| WBL/DBL (%) | 3.4 | 6.2 | 9.1 |
| Burst Index | 2.489 | 2.473 | 2.672 |

Example 35

The procedure of Example 34 was repeated, using PVOH/VAm/D-glucose (P) solution that had been aged for several hours to an increased viscosity. The polymer was added at levels sufficient to give 6 and 8 lb/ton (0.3 and 0.4%) application levels. Properties reported were measured in the machine direction and are summarized in Table 11.

TABLE 11

| Additive | None | P (0.3%) | P (0.4%) |
|---|---|---|---|
| DBL (km) | 5.598 | 5.524 | 5.909 |
| WBL (km) | 0.19 | 0.47 | 0.58 |
| WBL/DBL (%) | 3.4 | 8.5 | 9.8 |
| Burst Index | 2.489 | 2.676 | 2.837 |

The foregoing description and accompanying drawings set forth preferred embodiments of the invention at the present time. Various modifications, additions and alternative designs will, of course, become apparent to those skilled in the art in light of the foregoing teachings without departing from the scope of the invention. The scope of the invention is indicated by the following claims rather than by the foregoing description. All changes and variations that fall within the meaning and range of equivalency of the claims are to be embraced within their scope.

What is claimed is:

1. A method of increasing the strength of a cellulosic pulp product comprising:
   contacting wet cellulosic pulp with a composition comprising (i) at least one hydrophilic polymer containing at least two groups which are independently the same or different a primary amine group or a secondary amine group and at least one saccharide containing a reducible function, the hydrophilic polymer and the saccharide of the composition having been reacted in a crosslinking reaction prior to contacting the composition with the cellulosic pulp product to increase the viscosity the composition ,the crosslinking reaction being substantially terminated by changing at least one reaction condition; and,
   after contacting the cellulosic pulp with the composition, causing the crosslinking reaction between the hydrophilic polymer and the saccharide of the composition to proceed further by providing reaction conditions suitable to cause the reaction to proceed further.

2. The method of claim 1, wherein prior to contacting the wet cellulosic pulp with the composition, the hydrophilic polymer and the saccharide are mixed to form a reaction mixture and reacted to increase the viscosity of the reaction mixture, the reaction then being substantially terminated by reducing the pH of the composition.

3. The method of claim 1 wherein the predetermined viscosity of the composition is at least 20 cp at 80° C. when the reaction is substantially terminated.

4. The method of claim 1 wherein the predetermined viscosity of the composition is in the range of approximately 20 cp to 100 cp at 80° C. when the reaction is substantially terminated.

5. The method of claim 1 wherein the predetermined viscosity of the composition is in the range of approximately 20 cp to 60 cp at 80° C. when the reaction is substantially terminated.

6. The method of claim 1 wherein the predetermined viscosity of the composition is in the range of approximately 20 cp to 40 cp at 80° C. when the reaction is substantially terminated.

7. The method of claim 1, wherein the predetermined viscosity of the reduced pH composition is no greater than 80 cp at 23° C.

8. The method of claim 1 wherein the pH of the composition is greater than 7 during reaction and reduced to less than 7 to substantially terminate the reaction.

9. The method of claim 1 wherein the pH of the composition is greater in the range of approximately 10 to 12 during reaction and reduced to 6 or less to substantially terminate the reaction.

10. The method of claim 9 wherein the pH of the composition is reduced to a pH in the range of approximately 4 to 6 to substantially terminate the reaction.

11. The method of claim 9 wherein the pH of the composition is reduced to a pH in the range of approximately 5 to 6 to substantially terminate the reaction.

12. The method of claim 1 wherein the reducing saccharide is a monosaccharide, a disaccharide or a polysaccharide.

13. The method of claim 1 wherein the polymer is partially hydrolyzed poly(N-vinylformamide), partially hydrolyzed vinyl acetate/N-vinylformamide copolymer, hydrolyzed acrylonitrile/N-vinylformamide copolymer, amine functional polyacrylamide, acrylic acid/vinylamine copolymer, maleic anhydride/maleic acid copolymers with N-vinylformamide/vinylamine, N-vinylformamide/vinylamine polymers with vinyl sulfonate comonomer units, an NVF/vinylamine copolymer with at least one cationic monomer, diallylamine polymer, allylamine/diallylamine copolymer, urea/formaldehyde condensation polymers, melamine/formaldehyde condensation polymers, amidoamine polymers, amine/epichlorohydrin polymers, poly(ethyleneimine), hydrolyzed poly(2-alkyl-2-oxazoline) or partially hydrolyzed poly(2-alkyl-2-oxazoline).

14. The method of claim 1 wherein the polymer is a copolymer of vinyl amine and at least one other monomer.

15. The method of claim 1 wherein the cellulosic pulp is contacted with the composition in the presence of a base.

16. The method of claim 1 wherein the saccharide is at least one of glucose, lactose, or 2-deoxy-D-ribose.

17. The method of claim 1 wherein wet cellulosic pulp and the composition are contacted at room temperature or below and subsequently heated to induce crosslinking.

18. The method of claim 1 wherein the cellulosic pulp and the composition are heated to a temperature of at least 50° C.

19. The method of claim 1 wherein the cellulosic pulp and the composition are heated to a temperature of at least 70° C.

20. The method of claim 1 wherein the cellulosic pulp and the composition are heated to a temperature of at least 80° C.

21. The method of claim 11 further including the step of drying the wet cellulosic pulp.

22. The method of claim 13 wherein the polymer is an NVF/vinylamine copolymer with diallyldimehylammnonium chloride or with a cationic acrylate comonomer.

* * * * *